United States Patent [19]

Freeman et al.

[11] 4,334,200

[45] Jun. 8, 1982

[54] LASER INDUCED COLLISIONAL LASER PUMPING

[75] Inventors: Richard R. Freeman, Middletown; Jonathan C. White, Eatontown, both of N.J.

[73] Assignee: Bell Telephone Laboratories, Incorporated, Murray Hill, N.J.

[21] Appl. No.: 145,810

[22] Filed: May 1, 1980

[51] Int. Cl.³ .............................................. H01S 3/22
[52] U.S. Cl. ...................................... 372/90; 372/89; 372/55
[58] Field of Search ...................... 331/94.5 G, 94.5 P, 331/94.5 C, 94.5 D

[56] References Cited

PUBLICATIONS

"Observation of Laser Induced Inelastic Collisions", by Falcone et al., *Phys. Rev. A*, vol. 15, No. 3, pp. 1333–1335, Mar. 1977.
"H(2s) and H(2p) Branching Ratio in the Photodissociation of H₂ Near Threshold", by Mentall et al., *Jrnl. of Chem. Phys.*, vol. 67, No. 9, Nov. 1977.
"Numerical Analysis of Laser Induced Inelastic Collisions", by Harris et al., *IEEE Jrnl. of Quant. Electronics*, vol. QE–13, No. 12; pp. 972–978; Dec. 1977.
"Rapid Laser Induced Energy Transfer in Atomic Systems"; by Harris et al.; *Radiation Energy Conversion in Space*, vol. 61 of *Progress in Astro. and Aero.*, 1978.
"Switched Photodissociation: A Proposal for the Inversion of Atomic and Molecular Species", by J. C. White; *Optical Soc. of America*, 1980.
"Branching Ratios for TlBr Photodissociation with 2660 Å Radiation"; by White et al; *Jrnl. of Chemical Physics*, vol. 69, No. 5, pp. 2256–2257.
"Nonlinear Optical Processes in Atoms and Molecules Using Rare-Gas Halide Lasers"; by Bischel et al.; IEEE Jrnl. of Quant. Elect., vol. QE–15, No. 5, pp. 380–392, May 1979.
Quantum Efficiency of Florescence Excited by Photodissociation in Metal Halide Vapors and Applications", by Maya; IEEE Jrnl. Quant. Elect., vol. QE–15, No. 7, pp. 579–594; Jul. 1979.

*Primary Examiner*—William L. Sikes
*Assistant Examiner*—Leon Scott Jr.
*Attorney, Agent, or Firm*—Michael B. Einschlag; Daniel D. Dubosky

[57] ABSTRACT

A laser apparatus for inverting a population in an atomic or molecular species is provided. Energy is stored in a first species and a laser induced collisional energy transfer from that first species to a selected dissociative molecular state of a second species causes an inversion of one of the constituents of the second species. This is represented, in one embodiment of the present invention which utilizes a second species comprising a diatomic molecule, by the reaction $$A^* + BC + h\nu \rightarrow A + (BC)^* \rightarrow A + B^* + C,$$

where A and A* are the ground and excited states of the first species respectively, denoted as the storage species, BC and (BC)* are the ground and excited states of the second species respectively, which comprises atoms B and C, and B* is the excited state of atom B, which excited state is inverted.

14 Claims, 3 Drawing Figures

LASER INDUCED COLLISIONAL LASER PUMPING

BACKGROUND OF THE INVENTION

This invention pertains to the field of molecular dissociation lasers and more particularly to the field of molecular dissociation lasers which are pumped by laser induced collisions.

The use of molecular photodissociation as a means for producing photo-fragments in selected excited states has been summarized in a review paper entitled, "Quantum Efficiency of Florescence Excited by Photodissociation in Metal Halide Vapors and Applications", *IEEE Journal of Quantum Electronics,* Vol. QE-15, No. 7, July 1979, pp. 579–594, by Jakob Maya. A wide variety of atomic resonance line and molecular lasers have been fabricated using selective photodissociation as the inversion mechanism. However, the availability of practicable pump lasers has limited the choice of target molecules to those which absorb and dissociate at wavelengths of ~1900 Å or greater. These systems have generally yielded lasers in the visible or near-infrared and the extension of photodissociation techniques to other molecular systems to produce new VUV laser sources has proven difficult due to the lack of suitable pump sources at wavelengths shorter than 1900 Å.

SUMMARY OF THE INVENTION

A laser apparatus for inverting a population in an atomic or molecular species is based on selective energy storage followed by the energy transfer mechanism of laser induced collisions. Energy is stored in a first species and a laser induced collisional energy transfer from that first species to a selected dissociative molecular state of a second species causes an inversion of one of the constituents of the second species. This is represented, in one embodiment of the present invention which utilizes a second species comprising a diatomic molecule, by the reaction

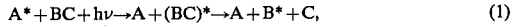

where A and A* are the ground and excited states of the first species respectively, denoted as the storage species, BC and (BC)* are the ground and excited states of the second species respectively, which second species comprises atoms B and C, and B* is the excited state of atom B, which excited state is inverted.

In this embodiment, energy is stored in storage species A by exciting an atom in the ground state to an excited state A*. A photon of energy hν, applied from a laser source, excites A* to a virtual level. During a collision of A* with molecule BC, a dipole-dipole interaction between the two species results in the deexcitation of A* to the ground state and the excitation of BC to a dissociative molecular state. The dissociative molecular state is chosen so that B* is formed in the upper level of a laser transition or rapidly decays thereto, whereby the population of that laser transition is inverted.

BRIEF DESCRIPTION OF THE DRAWING

A complete understanding of the present invention may be gained from a consideration of the detailed description presented hereinbelow in connection with the accompanying diagram in which.

DETAILED DESCRIPTION

Figure 1:
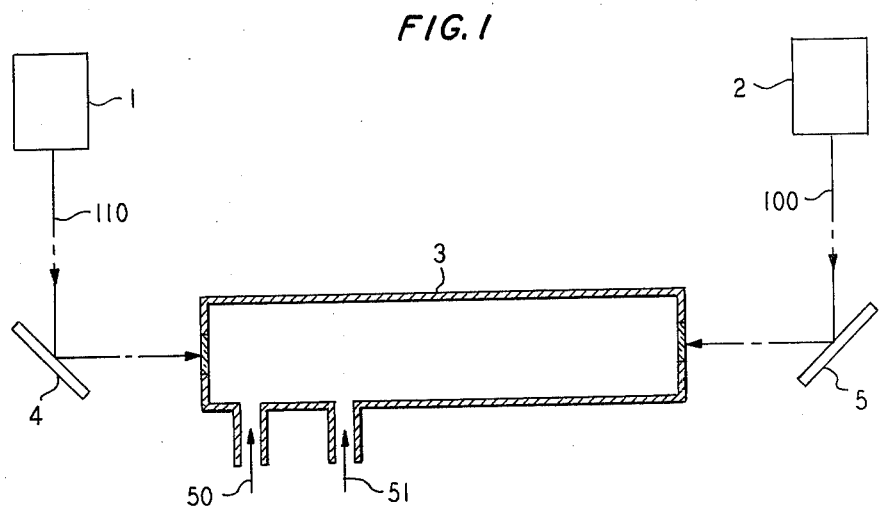
FIG. 1 shows, in pictorial form, a laser apparatus for an embodiment of the present invention.

A laser apparatus for inverting a population in an atomic or molecular species is based on selective energy storage followed by the energy transfer mechanism of laser induced collisions. Energy is stored in a first species and a laser induced collisional energy transfer from that first species to a selected dissociative molecular state of a second species causes an inversion of one of the constituents of the second species. This is represented, in one embodiment of the present invention which utilizes a second species comprising a diatomic molecule, by the reaction

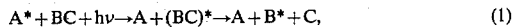

where A and A* are the ground and excited states of the first species respectively, denoted as the storage species, and BC and (BC) are the ground and excited states of the second species respectively, which second species comprises atoms B and C, and B* is the excited state of atom B, which excited state is inverted.

In this example, energy is stored in storage species A by exciting an atom in the ground state to an excited state A*. A photon of energy hν, applied from a laser source, excites A* to a virtual level. During a collision of A* with molecule BC, a dipole-dipole interaction between the two species results in the de-excitation of A* to the ground state and the excitation of BC to a dissociative molecular state (BC)*.

The dissociative molecular state, (BC)*, dissociates into B* and C, whereby the population of atom B in the excited state B* or an excited state to which B* rapidly decays is inverted. Thus, a laser transition may take place between an excited state of B and a lower state of atom B.

By choosing an appropriate excited state of storage species A, one can store energy slowly in the excited state of storage species A. The collisional cross section for energy transfer between the ground state of molecule BC and the excited state of A* is quite low when the energy level of an excited state of BC is not comparable in energy to the energy level of the metastable state A*. However, when a photon of energy hν is applied to A*, which energy, when added to the energy of the metastable state A*, is close in value to the energy level of (BC)*, the collisional cross section for energy transfer between A* and BC is made large. Thus, an important characteristic of the use of a laser induced collisional energy transfer is the ability to store energy slowly in storage species A and then rapidly to transfer this energy to the desired molecular state of the second species. This characteristic provides an advantage for inverting VUV laser transitions, which transitions typically have radiative lifetimes of a few nanoseconds or less. In addition, the use of a tunable laser source for providing the photons which induce the collisional energy transfer allows pumping of molecular states of the second species which might otherwise be inaccessible to fixed frequency laser sources.

Although we have discussed the present invention with an example having an atomic storage species we note that in general the storage species may be a molecule as well as an atom. Also, in the most general aspect of the present invention, the excitation mechanism for exciting the storage species from the ground state to the desired metastable excited state may be accomplished by a variety of mechanisms as will be clear to those skilled in the art, among these being electron excitation in a discharge tube or laser pumping.

Finally, as noted above, the second species, need not be merely a diatomic molecule. In fact, the dissociative state may comprise excited molecular fragments.

FIG. 1 shows an apparatus constructed according to an embodiment of the present invention. Arrows 50 and 51 indicate the flow of the storage species and second species, where both species are gaseous, into laser cavity 3. It should be clear to those skilled in the art that either or both the storage species and second species may be solid or liquid at room temperature. It should also be clear to those skilled in the art as to the appropriate means to apply to either or both the storage species and second species to provide liquids or gases as are necessary. Laser source of radiation 1 provides laser beam 110. Laser beam 110 is directed into laser cavity 3 by reflector 4. Radiation from laser beam 110 is used to excite the storage species to the appropriate excited state. Laser source of radiation 2 provides laser beam 100. Laser beam 100 is directed into laser cavity 3 by reflector 5. Radiation from laser 100 induces the collisional energy transfer from the excited state of the storage species to the excited state of the second species.

The following describes embodiments of two new VUV lasers which are constructed according to the present invention. In a first embodiment the level of the second species which is excited by the laser induced collisional energy transfer is a bound state, which bound state is strongly predissociated to yield the desired excited fragments. In the second embodiment, the level of the second species which is excited is unbound, i.e. repulsive at small internuclear separation and therefore exhibits a broad absorption for forming the desired excited fragments. The embodiments described hereinbelow provide storage of energy in a metastable excited state of the storage species by means of selective optical pumping.

The first embodiment of the present invention disclosed herein for energy transfer to a strongly predissociated molecular state is described by:

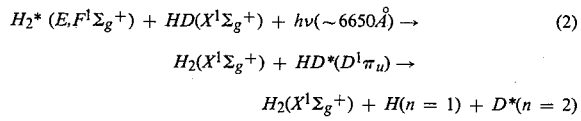

$$H_2^* (E,F^1\Sigma_g^+) + HD(X^1\Sigma_g^+) + h\nu(\sim 6650 \text{Å}) \rightarrow \quad (2)$$

$$H_2(X^1\Sigma_g^+) + HD^*(D^1\pi_u) \rightarrow$$

$$H_2(X^1\Sigma_g^+) + H(n=1) + D^*(n=2)$$

Figure 2:
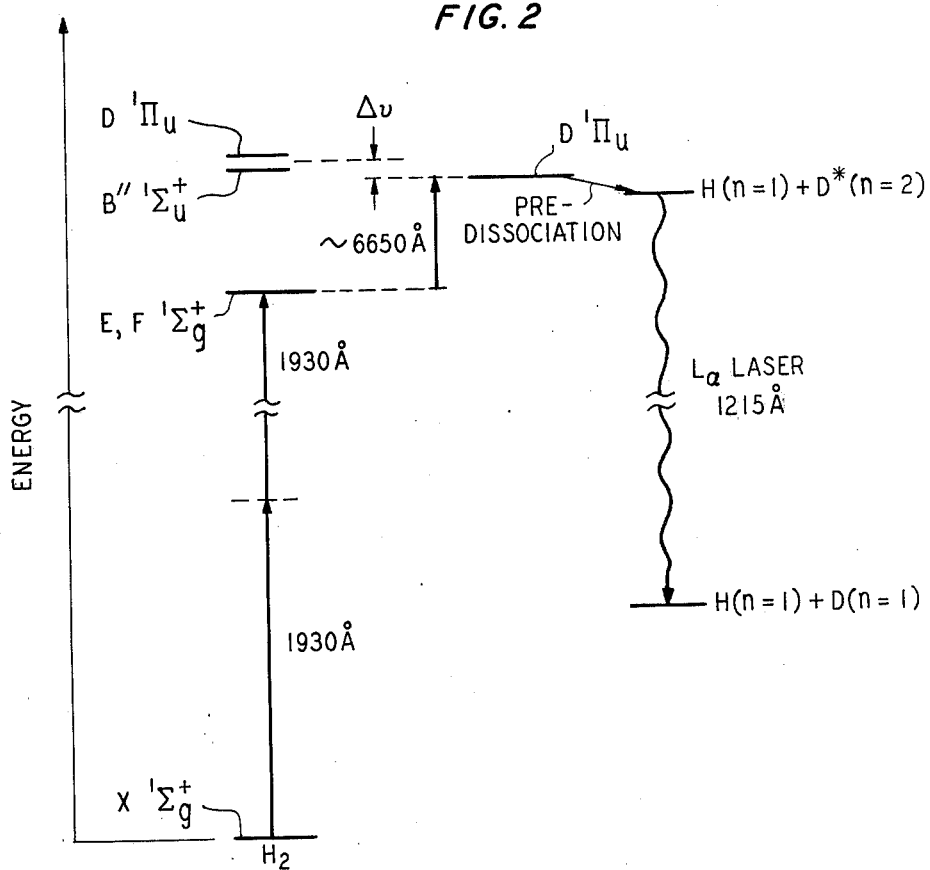
FIG. 2 shows, in pictorial form, the energy level diagram corresponding to a first embodiment of the present invention for providing a deuterium Lyman α laser.

An energy level diagram corresponding to the reaction described by EQ. 2 is shown in FIG. 2. First, energy is stored in the $H_2^*$ ($E,F^1\Sigma_g^+$) state of the hydrogen molecule, the storage species in this embodiment, by two photon pumping of the $X^1\Sigma_g^+$ ground state of a hydrogen molecule with 1930 Å radiation from an ArF excimer laser. Laser radiation from a tunable "transfer laser" at $\sim 6650$ Å is applied to the $H_2^*$. The $H_2^*$ may be viewed as being excited to a virtual level, which virtual level is coupled to the $B''^1\Sigma_u^+$ and $D^1\pi_u$ states of the hydrogen molecule. While in this virtual level, the $H_2^*$ molecule collides with the $X^1\Sigma_g^+$ ground state of a HD molecule and undergoes a dipole-dipole interaction. This results in the deexcitation of the $H_2^*$ molecule to the ground state and the excitation of the HD molecule to the $D^1\pi_u$ state. As is shown in an article entitled, "H(2s) and H(2p) Branching Ratio in the Photodissociation of $H_2$ Near Threshold", Journal of Chemical Physics, Vol. 67, No. 9, Nov. 1, 1977, pp. 3845–3850, by J. E. Mentall and P. Y. Guyon, the $D^1\pi_u$ level in $H_2$ is strongly predissociated by the $B''^1\Sigma_u^+$ state to yield an excited state $H^*(n=2)$ atom and a ground state $H(n=1)$ atom with nearly unity quantum efficiency. In HD the predissociation of the $D^1\pi_u$ level yields product states $H(n=1)$ and $D^*(n=2)$. Because of the 22 cm$^{-1}$ isotopic shift between the hydrogen and deuterium Lyman $\alpha$ ($L_\alpha$) transitions, the ground state H atom produced by the dissociation with not absorb the deuterium $L_\alpha$ wavelength. Therefore, when the reaction described by EQ. 2 is initiated by a "transfer laser" having a pulse length <2 nsec (the $L_\alpha$ fluoresence lifetime), a substantial inversion in the D atom is formed which provides an $L_\alpha$ laser at 1215 Å.

We now determine the expected gain for such a $L_\alpha$ laser. According to an article entitled, "Nuclear Optical Processes in Atoms and Molecules Using Rare-Gas Halide Lasers", IEEE Journal of Quantum Electronics, Vol. QE-15, No. 5, May 1979, pp. 380–392, by W. K. Bischel, J. Bokor, D. J. Kligler, and C. K. Rhodes, the two photon pumping of the $H_2$ ($E,F^1\Sigma_g^+$) metastable state has a maximum obtainable excited state density $N^*$ given by:

$$N^* = \alpha h\nu N/(\sigma_{pi}^2 T_p(1+T_p/\tau_{eff})), \quad (3)$$

where N and $N^*$ are the ground and excited state number densities respectively, $\alpha$ is the two photon excitation coefficient, $\sigma_{pi}$ is the photoionization cross section from the excited state, $T_p$ is the pump laser pulse width, and $\tau_{eff}$ is the effective lifetime of the excited state.

Since the largest $N^*$ is obtained when $\alpha$, which is inversely proportional to the pump laser linewidth, is maximized it is advantageous to spectrally narrow the excimer laser. Using an excimer laser having a linewidth of 0.1 cm$^{-1}$ provides $\alpha \simeq 10^{-29}$ cm$^4$/W for the $H_2$ system. For an $H_2$ density of $10^{18}$ molecules/cm$^3$, one has $\tau_{eff} \simeq 10^{-9}$ sec, $T_p = 10^{-8}$ sec, and $\sigma_{pi} \simeq 2 \times 10^{18}$ cm$^2$; which provides that the $H_2^*(E,F^1\Sigma_g^+)$ density is $\simeq 2.4 \times 10^{13}$ molecules/cm$^3$. The absorption length for the pump radiation is length = $(N(H_2)\alpha I)^{-1} = 10^3$ cm, where a laser intensity of $I = 10^8$ W/cm$^2$ is chosen to optimize the $H_2^*$ ($E,F^1\Sigma_g^+$) pumping.

We calculate the cross section for laser induced collisional energy transfer to the HD ($D^1\pi_u$) target state, $\sigma_c$, from the relation $$\sigma_c = 16\pi^3(\mu_1\mu_2\mu_3 E/(\sqrt{3}h\Delta\nu))^2/h^2\nu^2\rho_0^2 \quad (4)$$

where the $\mu_i$ are the relevant dipole matrix elements, E is the applied electric field of the transfer laser, $\Delta\nu$ is the effective detuning of the virtual level shown in FIG. 2, $\rho_0$ is the dephasing or Weisskopf radius and v is the mean relative velocity of the molecules at collision. The dipole matrix elements for the $H_2$—HD collision system are calculated using measured absorption cross sections and line widths for the $H_2$ molecule. For the $H_2$ (E,F→B'',D) transitions $\mu_1 \simeq 2.2 \times 10^{-18}$ esu-cm, an effective detuning $\Delta\nu = 2\pi \times 20$ cm$^{-1}$, for the $H_2$ (X→B'',D) transition $\mu_2 \simeq 1.7 \times 10^{-19}$ esu-cm, and for the HD(X→D) transition $\mu_3 \simeq 2.5 \times 10^{-19}$ esu-cm. The mean velocity for collision at 300° K. is $v = 2.5 \times 10^5$ cm/sec. For $\rho_0 = 5$ Å we compute $\sigma_c = 1.2 \times 10^{-25} (P/A)^{-1}$ cm$^2$, where P/A is in units of W/cm$^2$.

The fraction of population stored in $H_2^*(E, F^1\Sigma_g^+)$ which is transferred to the target HD* (D $^1\pi_u$) level is calculated from collision arguments by assuming that the transfer occurs on a time scale that is short compared to the $L_\alpha$ fluorescent lifetime and that the HD* (D$^1\pi_u$) state is predissociated with unity quantum efficiency. The inversion density along the deuterium $L_\alpha$ transition is equal to the fractional energy transfer and is given by:

$$\Delta N = N(HD) \sigma_c P / A \bar{v} \tau. \tag{5}$$

In this expression N(HD) is the number density of HD molecules and $\tau$ is the pulse length of the transfer laser. We use a tunable dye laser at ~6650 Å having a pulse energy of 10 mJ and a pulse length of $\tau = 1$ nsec as the "transfer laser". A twice diffraction limited beam is focused to an area of $10^{-3}$ cm$^2$ over a confocal distance of 30 cm to provide a "transfer laser" power density of $P/A = 10^{10}$ W/cm$^2$. For an HD density of $10^{18}$ molecules/cm$^3$ we obtain an inversion density $\Delta N = 7.2 \times 10^{12}$ atoms/cm$^3$, which inversion density represents a 30 percent transfer of the stored $H_2^*$ (E, $F^1\Sigma_g^+$) excitation.

The single pass gain at the $L_\alpha$ (1215 Å) transition is given by:

$$\text{Gain}(1215 \text{ Å}) = \exp(\Delta N \sigma_{gain} L), \tag{6}$$

where $\sigma_{gain}$ is the $L_\alpha$ gain cross section and L=30 cm is the confocal parameter. At 300° K., the Doppler width of 1 cm$^{-1}$ for the $L_\alpha$ transition gives a gain cross section $\sigma_{gain} = 1.2 \times 10^{-13}$ cm$^2$. Thus, for the parameters of the above embodiment, one obtains a single pass gain at 1215 Å of $e^{26}$.

A second embodiment of the present invention disclosed herein for energy transfer to an unbound molecular level is described by:

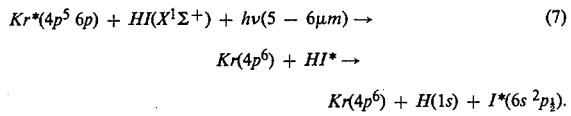

$$Kr^*(4p^5 6p) + HI(X^1\Sigma^+) + h\nu(5 - 6\mu m) \rightarrow \tag{7}$$

$$Kr(4p^6) + HI^* \rightarrow$$

$$Kr(4p^6) + H(1s) + I^*(6s\ ^2p_{\frac{1}{2}}).$$

Figure 3:
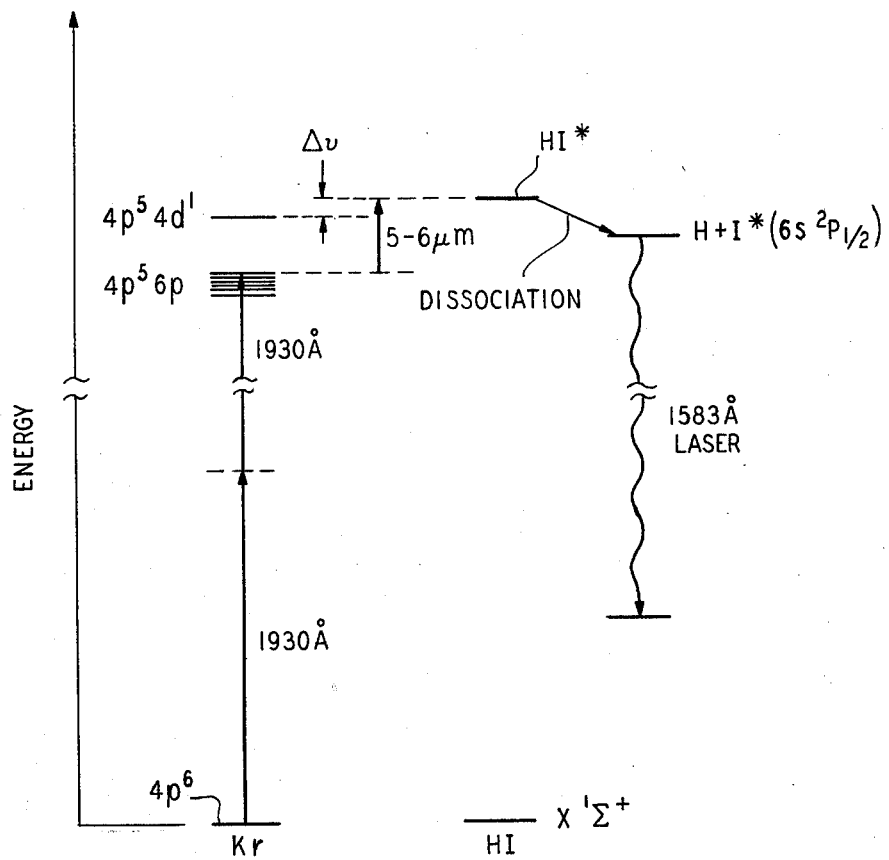
FIG. 3 shows, in pictorial form, the energy level diagram corresponding to a second embodiment of the present invention for providing an atomic Iodine 1583 Å laser.

An energy level diagram corresponding to the reaction described by EQ. 7 is shown in FIG. 3. First, energy is stored in the Kr*($4p^5$ 6p) state of the krypton atom, the storage species in this embodiment, by two photon pumping of the $4p^6$ ground state of a krypton atom with the 1930 Å radiation from an ArF excimer laser. Laser radiation from a "transfer laser" in the range of 5–6 μm, for example a CO molecular laser, is applied to the Kr*. The resulting laser induced collisional energy transfer to the HI molecule causes the HI to be excited to an unbound molecular level. This HI dissociates to provide an inversion of the I ($6s^2P_{\frac{1}{2}}$) resonance transition. (We note that laser emission may also be achieved from other I resonance transitions but we will not discuss them further in order to avoid complexity which would detract from an understanding of this embodiment.) Since unbound dissociative levels typically have broad absorptions of the order of several hundred wavenumbers in width, the acceptable "transfer laser" wavelength may be chosen to optimally couple to desired virtual levels in such a manner as to reduce the virtual detuning, $\Delta\nu$, and thereby increase the overall collision cross section $\sigma_c$ given in EQ. 4.

We use EQ. 3 to calculate the maximum Kr*($4p^5$ 6p) population storage density. With an ArF excimer laser having a 0.1 cm$^{-1}$ linewidth and a Kr number density of $10^{18}$ atoms/cm$^3$, we have $\alpha \simeq 10^{-28}$ cm$^4$/W, $\sigma_{pi} \simeq 10^{-18}$ cm$^2$, $T_p = 10^{-8}$ sec, and $\tau_{eff} \simeq 10^{-8}$ sec. This yields a Kr ($4p^5$ 6p) density of ~$10^{16}$ atoms/cm$^3$. At a pump power density of $10^8$ W/cm$^2$, the two photon absorption length is approximately 100 cm. We use EQ. 4 to compute the cross section for the laser induced collisional energy transfer. Using values for the relevant dipole matrix elements of $\mu_i \simeq 1$ debye = $10^{-18}$ esu-cm, $\rho_0 = 5$ Å, $\Delta\nu \simeq 2\pi \times 200$ cm$^{-1}$, and $v = 3.5 \times 10^4$ cm/sec, we have a collision cross section of $\sigma_c \sim 10^{23}(P/A)^{-1}$ cm$^2$. This value is approximately two orders of magnitude larger than that computed for the $H_2$—HD embodiment described hereinabove, due primarily to the larger dipole matrix elements.

The I(6s $^2P_{\frac{1}{2}}$) inversion density due to this embodiment of the present invention is computed with EQ. 5. Available "transfer lasers" in the 5–6 μm region can readily provide a 10 mJ pulse in 5 nsec, the I fluorescence lifetime, when focused to an area of $10^{-2}$ cm$^2$ over 5 cm. At this power density of $2 \times 10^8$ W/cm$^2$ and an HI number density $10^{17}$ molecules/cm$^3$, the fractional energy transfer to the HI* excited state is 3.5 percent. If the resulting I* excitation is distributed between the 6s $^2P$ and 6s $^4p$ levels according to their statistical weights, then approximately 1/9 of the energy will be transferred to the I(6s $^2P_{\frac{1}{2}}$) level. The I(6s $^2P_{\frac{1}{2}} \rightarrow 5p^5$ $2P^0_{3/2}$) inversion density is then $3.9 \times 10^{13}$ atoms/cm$^3$. Allowing for 0.2 cm$^{-1}$ recoil broadening of the I resonance transition, the gain cross section is $3.2 \times 10^{13}$ cm$^2$. Using these parameters with EQ. 6, we compute a single pass gain of $e^{62}$ at 1583 Å.

We would expect to find other embodiments similar to the second embodiment described hereinabove where energy from a 2480 Å KrF excimer laser pumps a Xe storage species by two photon excitation and the second species would be chosen from HCl or HBr.

It should be clear to those skilled in the art how a multiplicity of other embodiments may be constructed according to the present invention and it should also be apparent as to the utility of switched photodissociation as a tool for studying the dissociation of a wide range of molecular systems which would otherwise be inaccessible by conventional techniques due to their deep UV absorption wavelengths as well as for the production of lasing transitions thereof.

We claim:

1. An apparatus comprising:
   a chamber;
   a storage species and a second species disposed in said chamber, said second species being a molecular material;
   excitation means for exciting said storage species;
   characterized in that said apparatus further includes
   a laser source of laser radiation and
   means for applying said laser radiation to said storage species and said second species in said chamber, whereby said second species is excited to a higher state by a laser-induced collisional energy transfer interaction between said excited storage species and said second species and said higher state is a dissociative molecular state, whereupon said second species decays into a first and a second fragment.

2. A laser apparatus in accordance with claim 1 wherein said chamber is a laser cavity and at least one of said first or second fragments is excited to or decays to the upper level of a laser transition of said first or second fragment.

3. A laser apparatus in accordance with claim 2 wherein said excitation means for exciting said storage species is a second laser source.

4. A laser apparatus in accordance with claim 3 wherein said storage species is $H_2$ and said second species is HD.

5. A laser apparatus in accordance with claim 4 wherein said second laser source is an ArF excimer laser for producing laser radiation substantially at 1930 Å, which radiation excites said $H_2$.

6. A laser apparatus in accordance with claim 5 wherein said laser source provides tunable radiation in the vicinity of 6650 Å.

7. A laser apparatus in accordance with claim 3 wherein said storage species is Kr and said second species is a HI.

8. A laser apparatus in accordance with claim 7 wherein said second laser source is an ArF excimer laser source for producing laser radiation substantially at 1930 Å and said laser source provides radiation in the range of 5–6 μm.

9. A laser apparatus in accordance with claim 8 wherein said laser source is a CO molecular laser.

10. A laser apparatus in accordance with claim 3 wherein said storage species is Xe and said second species is HCl.

11. A laser apparatus in accordance with claim 3 wherein said storage species is Xe and said second species is HBr.

12. A laser apparatus in accordance with claim 2 wherein said excitation means for exciting said storage species is an electric discharge.

13. A laser apparatus in accordance with claim 2 wherein excitation means for exciting said storage species is an electron beam source.

14. A method of providing a laser transition which comprises the steps of:
   exciting a storage species, which storage species is disposed in a laser cavity;
   applying laser radiation to said storage species and a second species, which second species is disposed in said laser cavity, whereby energy is transferred to said second species from said storage species by a laser induced collision, said energy transfer being sufficient to excite said second species to a dissociative molecular state, which dissociative state decays into a first and second fragment, which at least one of said first or second fragments is excited to or decays to the upper level of a laser transition of said first or second fragment.

* * * * *